United States Patent [19]

Hanchen et al.

[11] 4,268,071
[45] May 19, 1981

[54] DEVICE FOR COUPLING PIPELINE FLANGES

[75] Inventors: Siegfried Hanchen, Ostfildern; Hans D. Fabrowsky, Neuhausen, both of Fed. Rep. of Germany

[73] Assignee: Herbert Hanchen KG, Ostfildern, Fed. Rep. of Germany

[21] Appl. No.: 966,515

[22] Filed: Dec. 4, 1978

[30] Foreign Application Priority Data

Dec. 2, 1977 [DE] Fed. Rep. of Germany ....... 2753667

[51] Int. Cl.³ .............................................. F16L 23/00
[52] U.S. Cl. ...................................... 285/18; 285/84; 285/320; 285/364
[58] Field of Search ......... 285/18, 320, 364, DIG. 21, 285/84; 277/24

[56] References Cited

U.S. PATENT DOCUMENTS

| 2,368,137 | 1/1945 | Harmon | 277/24 |
| 2,645,506 | 7/1953 | Sturgis | 285/364 X |
| 3,071,188 | 1/1963 | Raulins | 285/DIG. 7 X |
| 3,077,330 | 2/1963 | Lamphear | 285/320 X |
| 3,199,553 | 10/1965 | Garrett et al. | 285/320 X |
| 4,153,278 | 5/1979 | Ahlstone | 285/320 X |

FOREIGN PATENT DOCUMENTS 1559425 1/1969 France ................................. 285/320

Primary Examiner—Thomas F. Callaghan
Attorney, Agent, or Firm—Shlesinger, Arkwright, Garvey & Dinsmore

[57] ABSTRACT

A device for connecting the flanges of two pipelines including a series of radially equally spaced gripping dogs on one of the pipelines for gripping the flange on the other of the pipelines means for moving the gripping dogs axially and radially whereby the gripping dogs axially pull the flanges toward the other pipeline into sealing relationship.

19 Claims, 5 Drawing Figures

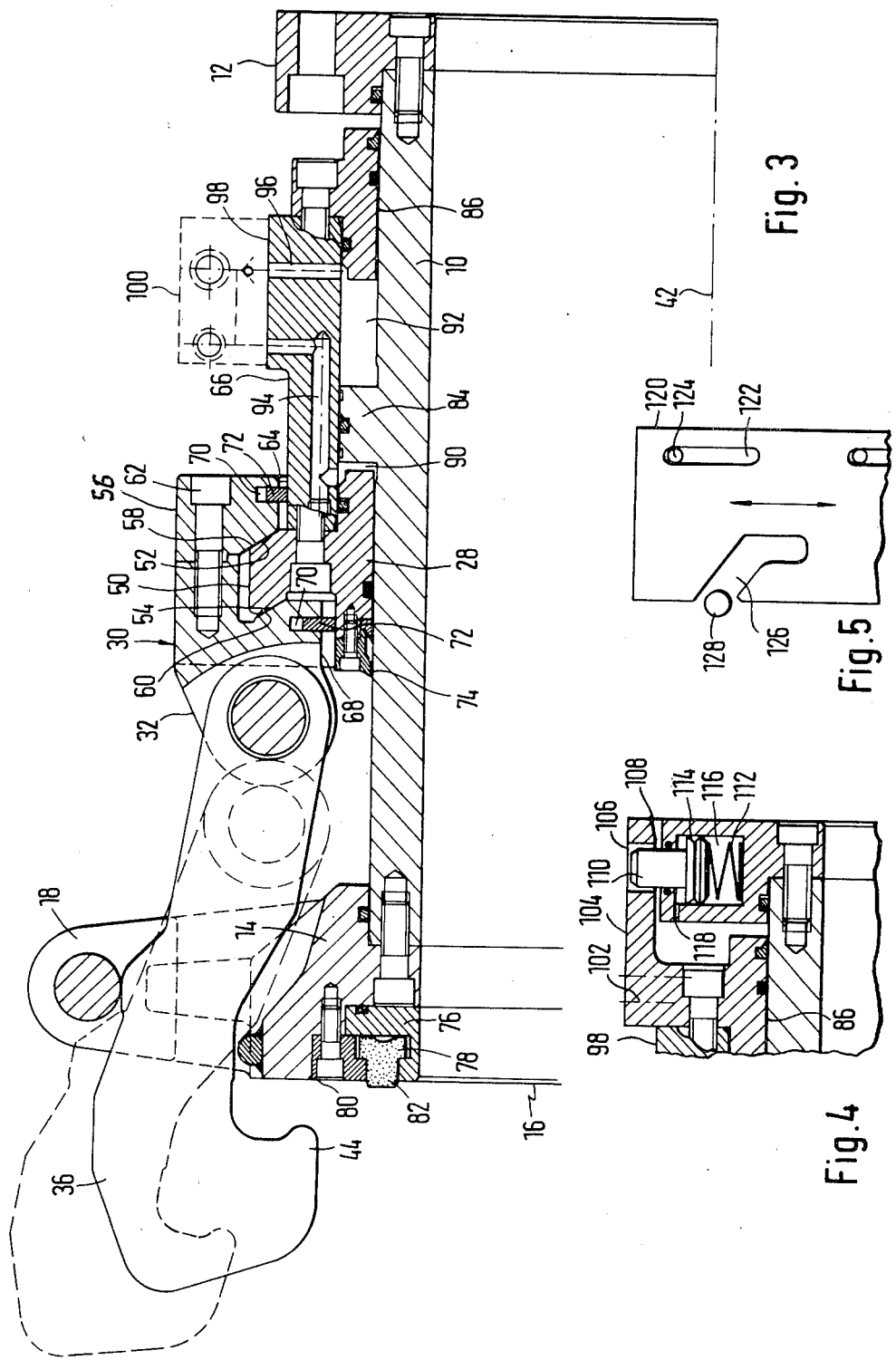

DEVICE FOR COUPLING PIPELINE FLANGES

The invention relates to a coupling device for connection of two pipes, particularly filling hoses, in which a group of gripping dogs are distributed around the periphery of the first pipe, projecting axially over the pipe flange and pivotable in radial planes, are axially extensible, and can be spread apart by drive and guide devices, and wherein with reverse drive, the gripping dogs engage over the flange of the second pipe and clamp it against the first flange.

For example, in tankers, this type of coupling device is known and is installed connected to filler lines leading to the reservoir chambers, and terminates on deck at the bow of the ship. The main line leading to an oil reservoir on the other hand is customarily suspended on a mast of a floating buoy, is caught by a cable coming out from the ship, and is drawn against the filler pipe installed on the ship by means of a cable winch, until the flanges at the ends of the pipes lie opposite eath other. The coupling device on the filler pipe assures the safety and maintenance of the connection during the filling process.

Since the connection flange of the pipe on the buoy side is frequently rough and distorted or is damaged because of rough operation, the tightness of the connection is endangered, and a sealed and lasting connection can only be produced with additional expense. Individual cylinders connected with the filler pipe for the clamping dogs are also known, which engage over and pull the opposite flange near. This practice is complicated to control, and multiplies the sealing problems as well as the number of moving parts.

Therefore, a primary object of the present invention is to provide a coupling device of the type that overcomes the described disadvantages and instead obtains a connection which is well sealed, without making the dogs and its operating devices non-uniform or too thick.

To solve this problem, the axial drive device for the coupling device is connected to a bearing ring which slides on the first pipeline, and the bearing ring has a convex spherical outside surface, turned away from the flange, with the curve midpoint lying axially on the pipe before the flange plane, on which is supported a dog bearing ring with a complementary concave spherical surface which is adjusted by extension of the second flange.

On the basis of this disclosure, only one single drive device is necessary for the axially sliding bearing ring, so that the cost remains low. This single clamp operation in connection with the dog bearing ring adjustably mounted on the spherical surface provides that all roughnesses present on the opposite flange are compensated for, and all gripping dogs then also seize behind the opposite surface, if this surface is drawn by the cable winch against the contact surface, and then should abut only on one side. The automatically compensating pivotability of the dog support on the spherical surface is of particular importance for the rough operation with ship filling. The use of the invention is of course not limited to tank filling, but extends to pipes for other conveyed material, or even pipes mounted on power vehicles.

In one preferred embodiment of the invention, the bearing ring has an outside shoulder, on the rear of which is found the spherical surface which is turned with its convex side toward the flange, and on the front of which is found a concave spherical surface of the same curve midpoint, and wherein the dog support ring has a convex spherical surface for engagement on the concave spherical surface of the bearing ring, and is biased by means of a screwed on, annular clamping jaw, which supports the rear concave side of the spherical surface, at the distance corresponding to the slide fitting between the opposite spherical surfaces. Thus the dog support which is essential for the connection and clamping process can be automatically set in the position which is best for transmission of force to the opposite flange, i.e. in a position which bears in mind an opposite flange engaging only on one side. If the opposite flange is then drawn further on, the dog support is set on the spherical surface, so that only axially tractive forces of the same size are transmitted over all of the dogs.

The front convex spherical surface lies on the bearing ring when the spreading and raising of the group pf dogs is on the complementary convex spherical surface of the dog support ring, so that with release of an existing coupling connection, no uncontrolled inhibiting forces can arise, if the dogs should be released from the opposite flange. This feature is important in emergency situations, if the coupling on a ship must be released as rapidly as possible so that the ship can move away.

A packing of elastic resistant material projecting forward over the plane of the contact surface can be found on a stator ring mounted on the first pipe and can be so measured that even with incomplete engagement of the opposite flange on the stator ring, an unbroken seal is guaranteed against the pump pressure upon the medium to be conveyed.

It is advantageous that the drive device for the axial movement of the bearing ring and of the dog support be a hydraulic cylinder, and the stationary piston rod with piston consist of the circumference of the first pipe, or a radial shoulder of it, and the cylinder consist of a cylindrical tube guided on the circumference of the first pipe, which tube has work chambers lying before and behind the piston, which chambers are operated selectively through a valve. A clamping device which is operated by auxiliary force can be provided, which can be connected and disconnected manually, in order to maintain the coupling during filling if there is a hydraulic breakdown.

Further individual features and advantages of the invention are to be seen in the following description of an embodiment shown in the drawings.

FIG. 3 shows an enlarged longitudinal cross section through the device of FIG. 1.

FIG. 4 shows a clamping device for the coupling of FIG. 3.

FIG. 5 shows a variation of the clamping device of FIG. 4.

Figure 2:
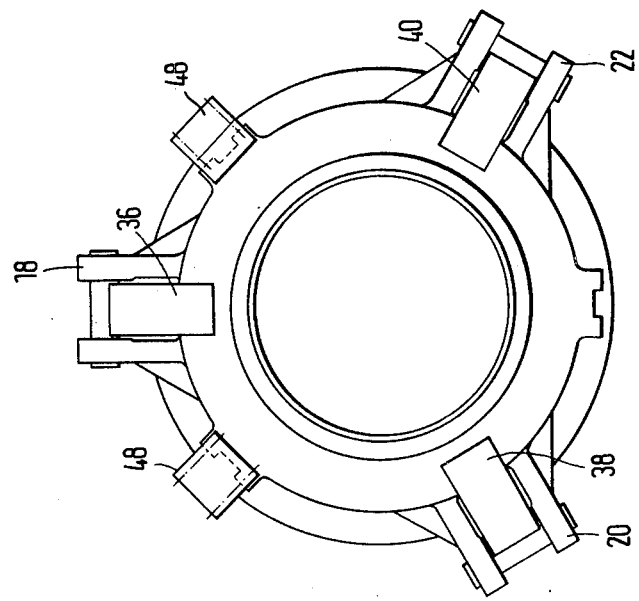
FIG. 2 shows a frontal view of the device of FIG. 1.
Figure 1:
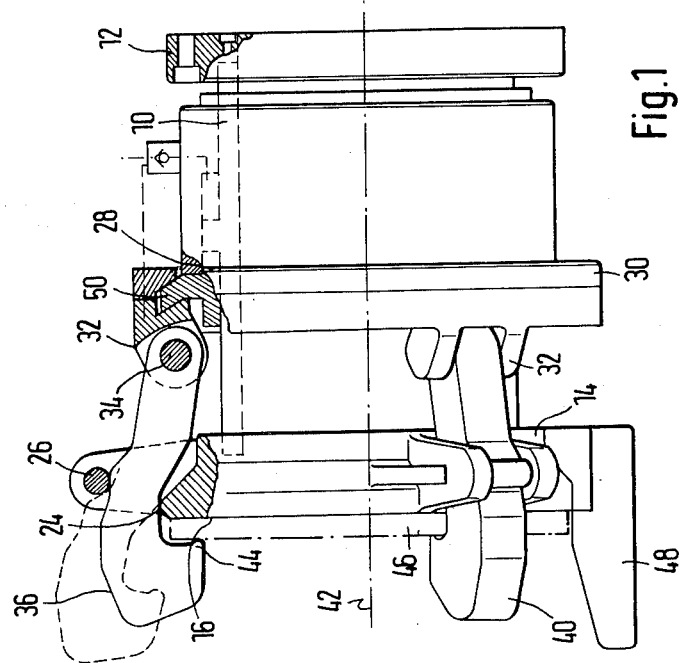
FIG. 1 shows a partial cutout of a side view of a coupling device of the invention.

FIGS. 1 and 2 show a filler pipe 10 stationary on the bow of a tanker or on any other desired tank vehicle or the like, and provided on the rear with a connection flange 12, to which is attached a pipeline leading to the reservoir chambers of the tanker. At the front end of filler pipe 10 is found a stator ring 14 with a front contact surface 16. Stator ring 14 supports three radially projecting dog guide forks 18, 20 and 22, distributed at uniform spacing around its periphery, with inner guide surface 24 and outer guide surface in the form of pin 26.

Bearing ring 28 is axially movable around filler pipe 10, movable to the left from the rear position shown in FIG. 1. Bearing ring 28 is connected with a dog support ring 30, at the front end of which are found three dog support forks 32 ranged with the dog guide forks 18 to 22. Gripping dogs 36, 38, 40 are mounted in dog support forks 32 on transverse pins 34 so that they can pivot in planes radial to the longitudinal middle axis 42 of filler pipe 10. Gripping dogs 36, 38, 40 are provided with outer and inner guide curves, which run on surfaces 24, 26 of the dog guide forks when the bearing member 28 is moved to the left, so that the front pressure members 44 of the dogs are removed in axial direction by contact surface 16 as well as also being spread apart in radial direction.

In its spread out position, as shown, the gripping dogs 36, 38, 40 make it possible for a not shown pipeline to move closer, which in the case of filling a tanker is suspended on the mast of a floating buoy, and has a flange at the end. This buoy-side pipe is caught by the tanker by means of a drawing cable, and is drawn up to the tanker with a cable winch, to contact surface 16 of stator ring 14. During this approach movement, the opposite flange 46 of the second pipe, shown in broken line in FIG. 1, engages on centering jaw 48, until it engages with its front surface on contact surface 16, and there it operates the end connections (not shown), over which the drive device is connected, which moves bearing ring 28 to the right and therewith draws gripping dogs 36, 38, 40 to the right, so that hooked pressure members 44 engage over the other flange 46 and hold it tightly against surface 16 of stator ring 14.

Since it is possible that the other flange 46 of the second pipe can be misshapen or damaged, and thus not have a smooth front surface, and can have non-uniform distances to stator ring 14, the danger exists that only one or two of the gripping dogs really engage on flange 46, while the others do not engage with the opposite flange at all. Thereby, the engaging dogs are overloaded, and the drive device acts non-uniformly, so that the drive ring 28 and other structural parts of the drive device get wedged and are damaged. Furthermore, with only partial contact of flange 46 on surface 26, there is the danger that there will not be a seal and the conveyed fluid leaks out through the gap.

In order to avoid this danger, dog support ring 30 is mounted to oscillate on the spherical surfaces of one shoulder 50 of bearing ring 28 so that ring 30, if it is moved to the right by a drive device, as in FIG. 1, automatically oscillates around the curve midpoint of the spherical slide surfaces, lying on longitudinal axis 42, and thus can be adjusted, and all the gripping dogs 36, 38, 40 uniformly engage on the opposite flange 46. The pivotability of the dog support ring on the spherical surface of shoulder 50 is such that any unevennesses on opposite flange 46 is compensated for and all of the dogs should engage behind the opposite flange, if it is drawn by the cable winch against surface 16, engaging on only one side.

Further individual features of the coupling are shown in FIG. 3. Shoulder 50 of bearing ring 28 has a rear convex spherical surface 52 turned away from the flange of stator ring 14, as well as a front concave spherical surface 54. Dog support ring 30 is upright to the plane of FIG. 3 for purposes of the mounting and surrounds a rear clamping jaw ring 56, which has a concave spherical surface 58 of the same curve as convex spherical surface 52. In a rear cutout of the dog support ring 30 is found a convex spherical surface 60, which has the same curve as slide surface 54 on shoulder 50.

All spherical surfaces 52, 54, 58, 60 have the same curve midpoint, which lies on the longitudinal middle axis 42 of the filler pipe or on its extension. The centering ring 56 is connected on its periphery with dog ring support 30 by several axially running screws 62, so that a slide fitting is maintained between the spherical surfaces which lie opposite each other and an unhindered oscillating setting capability of the longitudinal middle axis of the dog support ring relative to the longitudinal middle axis 42 of the filler pipe can be guaranteed.

The maximum lift of the oscillating pivot movement is limited by the distance between the inside ring surface 64 of clamping jaw ring 56 and the outside surface of a cylindrical pipe 66 and the inside annular surface 68 of dog support ring 30 for the peripheral surface of a front projection on support 28. In order to protect the slide oscillation bearing against corrosion, the space between shoulder 50 and the dog support ring is filled with lubricant and closed on the outside by packing rings 72 which are radially movable in grooves 70, whereby packing rings 72 engage with their inside periphery tightly on cylindrical tube 66 or on the front projection of bearing ring 28. On the front of bearing ring 28 is found a preferably metallic strip ring 74, which slides on the circumference of filler pipe 10 and serves as stripper for ice and thick dirt.

Stator ring 14 has a packing support 76 in a cutout of its front contact surface 16, and support 76 includes a packing 78 shown in profile in FIG. 3. Packing 78 is held tightly in the stator ring with a clamp ring 80 and projects with a shoulder 82 forward out of an axial groove formed by clamp ring 80 and receiving ring 76 over contact surface 16. Packing 78 consists of an elastic, tear-resistant material and is such that even with incomplete engagement of the opposite flange on flange 16 (sic), it is held in a seal against the pressure of the medium to be conveyed.

In the embodiment shown, the drive device for the axial longitudinal movement of element 28 consists of a hydraulic control cylinder which moves in relation to a stationary longitudinal cross section of filler pipe 10, on the periphery of which a radial shoulder 84 forms the piston. The hydraulic cylinder is formed by bearing ring 28, with a cylinder pipe 66 and a bearing ring 86 connected therewith. Between the rear of front bearing ring 28, cylindrical pipe 66 and front of piston 84, there is a first cylindrical annular chamber 90, and a second cylindrical annular chamber 92 is formed by the rear of piston 84, cylindrical pipe 66 and the front of rear bearing ring 86. Hydraulic lines 94 or 96 remain connected with cylindrical chambers 90 and 92 respectively, and are connected to a control valve 100 on a structural surface 98 on the periphery of cylindrical pipe 66.

The described coupling device is preferably inserted in the type of filler couplings in which two filler pipes 10 are arranged one after the other on the bow of a tanker, and the pipes stand at a standard distance from each other, while the second movable pipeline coming from the float buoy has a fork, of which the ends, provided with opposite flanges, are guided to the contact surfaces 16 of both filler pipes arranged one behind the other. With this type of structure, as in FIG. 2, only two centering jaws 48 are so arranged on each stator ring that they grasp those opposite flanges on the outside obliquely from above and obliquely from below. With this twin arrangement, the individual setting capacity or the oscillating pivotability of the dog support rings is particularly important, since leaks of both flangers can be even greater from a common planar surface than with one single flange. The drive devices are then operated as above only if, on surface 16, one of the two end contacts is moved or connects with the opposite flange.

In rest position, the operation cylinder is drawn back on filling pipe 10, so that the dogs are in their position near stator ring 14. To prepare the filler coupling, the cylinder is moved forward so that the dogs are spread apart. The spherical surface 54 facing forward toward the stator ring transmits a centering force to bearing ring 28 to cause the dogs to open, particularly in case of emergency, for rapid opening of the filler coupling.

For mechanical infallibility of the coupling during filling, a clamping device can be provided which maintains the sealed connected between stator ring 14 and flange 46, FIG. 1, in case of failure of the hydraulic system. FIG. 4 shows a structural element 102 fastened on rear bearing ring 86, which element has a sheath-like section 104, on which several openings 106 are distributed around the periphery. Each opening 106 has a clamp bolt 110, which is guided to slide radially in flange 12 of the filler pipe 10 and is biased outward by a spring 112. The sheathing section or sections 104 have an angled surface 108 at the rear end, in order to be able to push back clamp bolts 110 and to pass thereover before engaging the opening 106. Clamp bolt 110 is guided by means of a piston 114 in a radial bore 116. For unclamping, there is a controllable oil feed system branched off from the main pump over passage 118. A not shown reverse valve in the feed line makes possible the connection of a manually controlled emergency pump.

The clamping device can also be embodied otherwise, for example wherein a hydraulic, pneumatic or electric power is used, which in any case is still replaceable by a manual operation for emergency unclamping. FIG. 5 is a diagram of an annular sheathing 120, which has peripheral slots 122, with which it is moved on radial bolts running around the circumference of flange 12. Also, annular sheathing 120 includes open clamping slots 126 at its forward end, in which are held clamp bolts 128 which project radially from bearing ring 86, if the cylinder moves to the right on filler pipe 10 with the operation of the coupling, as shown in FIG. 3. Clamp bolts 128 are held as bayonette closures by rotation of annular sheathing 120. Annular sheathing 120 can be driven by toothed wheel gearing from an electromotor or the like, which for emergencies is replaced by manual operation.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What is claimed is:

1. A coupling device for connecting the flanges of two flanged pipelines comprising a plurality of radially spaced axially extending gripping dogs positioned around the circumference of one of said pipelines, said dogs being pivotally connected to a dog support ring so that said dogs project and pivot over the flange of one of said pipelines in a radial plane for engaging the flange of the other of said pipelines, drive means for axially moving said dog support ring and said dogs, and guide means for controlling the pivoting of said dogs in relation to axial movement of said dog support ring, said drive means including a bearing ring axially slideable on said one of said pipelines and including an outer convex spherical surface having its center of curvature on the axis of said one of said pipelines near the plane of the flange thereon, said dog support ring having a concave spherical surface complementary to said convex surface, annular clamp means for maintaining said spherical surfaces in slideable contact, whereby upon actuation of said drive means, said dogs axially urge said flanges into contact and misalignment of said flanges is compensated by pivotal motion of said dog support ring on said bearing ring at said surfaces.

2. A device as in claim 1, wherein said bearing ring includes a shoulder the rear of which includes said convex spherical surface, and the front of which includes a concave spherical surface, and wherein said dog support ring includes a convex spherical surface for engagement on said concave spherical surface of bearing ring and is retained by means of an annular clamp jaw including a rear concave spherical surface on which a slide bearing fitting is biased between the relevant spherical surfaces opposite each other.

3. A device as in claim 2, wherein said dog support ring and said clamp jaw are coaxial relative to said bearing ring on both sides of said spherical surfaces and are radially spaced from said bearing ring.

4. A device as in claim 3, wherein the radial distances between said dog support ring and said bearing ring have outward movement limited by radial peripheral grooves and packing rings therein which close off the structure and are filled with lubricant.

5. A device as im claim 1, and including forks on the front of said dog support ring and said dogs being radially pivotably mounted in said forks.

6. A device as in claim 1, and including a stator ring on the end of said one of said pipelines and having a contact surface and sealing means for the flange on the other of said pipelines and, guide means radially spaced on said stator ring for guiding said gripping dogs.

7. A device as in claim 6 and wherein the front of said stator ring includes an annular cutout having annular packing therein projecting forward of said contact surface, said packing being of resilient elastic material and being so sized that upon incomplete engagement of the opposite flange on said contact surface of said stator ring a pressure seal is provided.

8. A device as in claim 2 including a scraper on the front of said bearing ring.

9. A device as in claim 2, wherein the free ends of said gripping dogs include a hook-shaped pressure element turned radially inward.

10. A coupling device for connecting the flanges of first and second flanged pipelines comprising a plurality of radially spaced axially extending gripping dogs positioned around the circumference of said first pipeline, said dogs being pivotally connected to a dog support ring so that said dogs project and pivot over the flange of said first pipeline in radial planes for engaging the flange of the second pipeline, drive means for axially moving said dog support ring and said dogs, guide means for controlling the pivoting of said dogs in relation to axial movement of said dog support ring, said drive means including a bearing ring member having an annular chamber forming a hydraulic cylinder encircling said first pipeline, said first pipeline including an annular rib projecting into said chamber and forming a piston therein, said bearing ring member including an outer convex spherical surface having its center of curvature on the axis of said first pipeline near the plane of the flange thereon, said dog support ring having a concave spherical surface complementary to said convex surface, annular clamp means for maintaining said spherical surfaces in slideable contact, and means for selectively admitting hydraulic fluid under pressure into said chamber for axially moving said bearing ring member and said dog support ring, whereby upon actuation of said drive means, said dogs move axially and radially for engaging the flange of said second pipeline and urge the flange of said second pipeline into sealing engagement with the flange of said first pipeline and angular and radial misalignment of said flanges is compensated by pivotal motion of said dog support ring on said bearing ring member at said surfaces.

11. A device as in claim 10, wherein said bearing ring member consists of a first bearing element on one side of said piston and another bearing element opposite said first bearing element, and a pipe section between said bearing elements and including hydraulic passages.

12. A device as in claim 11, wherein the length of travel of said hydraulic cylinder corresponds to at least the lift of said dogs, and wherein the pressing of said flanges together is maintained by a control valve means.

13. A device as in claim 10, wherein a clamping device for mechanically clamping said movable bearing ring member in an operative position in relation to the first pipe.

14. A device as in claim 13, and an auxiliary drive maually movable for operation of said clamping device.

15. A device as in claim 13, wherein said clamping device is operable between said hydraulic cylinder and a stationary rear flange on said first pipeline.

16. A device as in claim 15, and including a sheathing section having radial openings and surrounding the first pipe spaced therefrom and fastened on a support element of the movable hydraulic cylinder and spring biased clamp bolts projecting from the circumference of said rear flange and attached to said radial openings.

17. A device as in claim 16, wherein said sheathing section has an oblique surface for passing over the clamp bolt.

18. A device as in claim 17, wherein said clamp bolts are movable hydraulically against the bias force of their spring.

19. A device as in claim 13, or 14, wherein said clamping device comprises an annular sheathing axially fixed in relation to said first pipeline, but radially movable and which includes receiver slots for clamp bolts connected with said bearing ring member as a bayonette connection.

* * * * *